(12) United States Patent
Readman

(10) Patent No.: US 10,584,821 B2
(45) Date of Patent: Mar. 10, 2020

(54) COUPLING ASSEMBLY

(75) Inventor: Matthew Readman, Wincham (GB)

(73) Assignee: Self Energising Coupling Company Limited, Wincham (GB)

( * ) Notice: Subject to any disclaimer, the term of this patent is extended or adjusted under 35 U.S.C. 154(b) by 0 days.

(21) Appl. No.: 13/380,286

(22) PCT Filed: Jun. 25, 2010

(86) PCT No.: PCT/GB2010/051058
§ 371 (c)(1),
(2), (4) Date: Jan. 19, 2012

(87) PCT Pub. No.: WO2010/150027
PCT Pub. Date: Dec. 29, 2010

(65) Prior Publication Data
US 2012/0103450 A1 May 3, 2012

(30) Foreign Application Priority Data
Jun. 25, 2009 (GB) .................... 0911008.1

(51) Int. Cl.
*F16L 55/00* (2006.01)
*F16L 55/10* (2006.01)

(52) U.S. Cl.
CPC ..... *F16L 55/1015* (2013.01); *Y10T 29/49826* (2015.01); *Y10T 137/9029* (2015.04)

(58) Field of Classification Search
CPC ............ F16L 55/1015; Y10T 29/49826; Y10T 137/9029
USPC ....... 137/68.11, 68.14, 68.15, 614.04, 68.16; 285/2, 1, 3, 304
See application file for complete search history.

(56) References Cited

U.S. PATENT DOCUMENTS

| 2,048,387 | A | * | 7/1936 | Johnsen | 137/75 |
| 3,794,057 | A | * | 2/1974 | Badger | 137/68.15 |
| 4,483,359 | A | * | 11/1984 | Robertson | 137/68.15 |

(Continued)

FOREIGN PATENT DOCUMENTS

| DE | 10 2007 050370 A1 | 4/2009 |
| WO | WO 2007017677 A1 * | 2/2007 |
| WO | 2008 087457 A1 | 7/2008 |

OTHER PUBLICATIONS

International Search Report for PCT/GB2010/051058, dated Nov. 11, 2010.

*Primary Examiner* — P. Macade Nichols
(74) *Attorney, Agent, or Firm* — Shumaker, Loop & Kendrick, LLP

(57) ABSTRACT

A coupling assembly is provided having a first member and a second member. The first member is able to be coupled to the second member by relative movement along a coupling axis. In use, a tension component carries the axial tensile load of the coupling assembly. In order to decouple the coupling without removing the tension component, it is necessary to apply sufficient tensile force to fracture the tension component. Thus the tension component is designed to fracture in to two parts along a single fracture. Advantageously, because only a single tensile component is used, the precision in the set force necessary to decouple the two parts is improved. The coupling assembly is particularly suitable to joining two part of an oil pipeline in order to provide a safety, breakout function.

9 Claims, 15 Drawing Sheets

(56) References Cited

U.S. PATENT DOCUMENTS 4,614,201 A 9/1986 King et al.
5,014,732 A 5/1991 Nitzberg

* cited by examiner

COUPLING ASSEMBLY

CROSS-REFERENCE TO RELATED APPLICATIONS

This application claims priority to PCT/GB2010/051058 filed Jun. 25, 2010, which claims priority to GB0911008.1 filed Jun. 25, 2009, the contents of both of which are incorporated by reference herein.

TECHNICAL FIELD AND BACKGROUND

The present invention relates to a coupling assembly and in particular, although not exclusively, to a coupling assembly for use in connecting fluid passages in oil and gas pipe lines.

When extracting oil and gas from well heads beneath the sea, it is necessary to couple two fluid passages together. WO 2007/017677 discloses a particularly suitable coupling assembly and the contents thereof are hereby incorporated by reference. The known coupling comprises a male member and female member. The male member includes a probe that is inserted into a socket of the female member. The probe and socket are generally circular in cross-section and the two parts can be mated by relative movement of the two parts along a first longitudinal direction. Both the male and female parts include through bores. When the coupling is mated the through bores are aligned to provide a fluid conduit through the coupling. Fluid is maintained within the fluid conduit due to sealing rings that are provided either side of the intersection of the two through bores and between the socket and probe.

In WO 2007/017677, unintentional de-coupling of the coupling assembly is prevented using a shear pin that is inserted through a hole on either side of the socket and an aligned hole in the probe. The pin extends at right angles to the first longitudinal axis. When a force is exerted to urge the male and female members apart, the shear pin resists the separation. In order to allow the pin to be inserted, the holes are necessarily larger than the pin. Thus some movement is observed as the male member and female member pull apart and relax. When the force urging the male and female members apart exceeds a predetermined force, the shear pin is designed to fracture on either side of the probe and allow decoupling. This force is determined as the break out strength of the coupling and is designed to avoid damaging equipment or pipelines. Other break out mechanisms are also disclosed operating a similar principle of requiring a shear fracture to occur on each side of the probe.

Whilst the coupling assembly disclosed in WO 2007/017677 provides a suitable releasable coupling assembly, it has been found that during break out of the coupling assembly false activations may occur, the probe may jam within the socket when withdrawing and the setting of the breakout strength may be imprecise. For instance, if more than one shear component is provided, it is natural for one to shear at a lower force than the other. This causes the weakest component to shear first which transfers the load to a neighbouring component. Thus the components tend to fail in a "zip like manner". This so called false activation makes it hard to design the coupling assembly to breakout at a precise force. Furthermore, because a part of the probe is released before another part, the withdrawal of the probe from the socket may be caused to become angled to the longitudinal axis which can cause the probe to jam within the socket.

BRIEF SUMMARY OF THE INVENTION

It is an aim of the present invention to attempt to overcome at least one of the above or other disadvantages. It is a further aim to provide a coupling assembly having an improved breakout accuracy. It is a further aim to provide a coupling assembly having reduced jamming likelihood during withdrawal.

According to the present invention there is provided coupling assembly, and method as set forth in the appended claims. Other features of the invention will be apparent from the dependent claims, and the description which follows.

According to the exemplary embodiments there is provided a coupling assembly having a first member and a second member. The first member is able to be coupled to the second member by relative movement along a coupling axis. In use, a tension component carries the axial tensile load of the coupling assembly. In order to decouple the coupling without removing the tension component, it is necessary to apply sufficient tensile force to fracture the tension component. Thus the tension component is designed to fracture in to two parts along a single fracture.

Suitably the tension component ties the two parts together. Suitably the tension component is arranged to extend between the two parts along a substantially linear path. The tension component may include a fracture zone. Here the fracture zone is designed to fracture at a predetermined tensile force. Thus the tension component fractures into two parts once a fracture line extends through the tension component at an angle to the elongate axis. Once the tension component is fractured in to two parts, the tension component can no longer carry the axial tension load. The tension component may preferably be pre-stressed. For instance the tension component may be pre-stressed by applying a tension to the tension component. The tension may be applied by moving a stop to act to shorten the length of the tension component between the two parts. In the exemplary embodiments the tension component is arranged to be parallel to a coupling axis of the first and second parts.

In one exemplary embodiment, the coupling assembly comprises a male member and female member. The male member comprises a probe and the female member comprises a socket. The male member has a fluid passageway that has an exit on a circumferential face of the probe. The female member has a fluid passageway that has an exit on a circumferential face of the socket. The coupling assembly is coupled by inserting the probe into the socket. The tension component ties the probe to the socket. Preferably the tension component is coincident with the coupling axis of the probe and socket. Preferably, the male member includes a shoulder that defines a probe extension. The probe extension has a reduced cross-sectional area to the probe. Here the socket includes a hip such that the hip defines a socket extension having reduced cross-sectional area.

In an alternative exemplary embodiment, the coupling includes a male member having a probe and a shut off valve. The shut off valve is slidably mounted on the probe. The male member includes a fluid passageway that terminates on a circumferential face of the probe. The shut off valve slides between two extents. In one extent the fluid passageway is closed and in the other it is open. The male member is coupled to a second part by relative movement of the probe and second part. The male member includes means to releasably lock the shut off valve relative to the second part. Preferably the means to releasably lock the shut off valve comprise bolts that are urged to lock the second part when the shut off valve is not in the closed position. The bolts may be released from locking engagement by aligning a cavity formed in a part that is fixed in relation to the probe. Here the coupling assembly further comprises a cage that is arranged to restrict the movement of the male member relative to the second part when the coupling assembly is mated. The cage does not restrict the movement of the shut of valve relative to the second part in the coupling direction.

Optionally the coupling assembly may comprise two male members each having a shut off valve slidably mounted thereon. Each shut off valve may include means to lock to the other shut off valve when the shut off valve is in an open position. Here the coupling assembly includes a cage that restricts movement of the two shut of valves in all directions accept linear relative movement in the coupling direction. Thus the cage carries the separation forces generated not in the coupling direction. The cage may be separate to both the male coupling members. Alternatively, the cage may be part of one of the coupling members. In this case the cage is suitably integrally formed with one of the shut of valves.

According to a further aspect there is provided a method of coupling a first and second member. The method comprises causing the axial tensile stresses applied to the coupling to be carried by a single tension component.

Preferably the method comprises pre-stressing the tension component. The method may comprise applying a tensile force to the first and second member and causing the tension component to fracture, further tension causing the first and second parts to decouple.

Optionally the method may comprise causing a shut of valve slidably mounted to a first male part to be releasably coupled to a second female part. The method may comprise causing the shut of valve to be released when the shut of valve is in a closed position. Further optionally, the method may comprise causing a shut of valve of a first male member to releasably couple to a shut of valve of a second male member. Here the method comprises causing the two shut of valves to be released when both of the shut of valves are closed.

According to a further aspect there is provided a coupling assembly the coupling comprises a male member having a probe and a shut off valve. The shut off valve is slidably mounted on the probe. The male member includes a fluid passageway that terminates on a circumferential face of the probe. The shut off valve slides between two extents. In one extent the fluid passageway is closed and in the other it is open. The male member is coupled to a second member by relative movement of the male member and second member. The male member includes means to releasably lock the shut off valve relative to the second member when the shut of valve is not in the closed portion.

In this aspect the two members may be prevented from pulling apart by a break out means. Optionally the break out means may be a single tension component however other break out means may also be used.

Preferably the means to releasably lock the shut off valve comprise bolts that are urged to lock the part when the shut off valve is not in the closed position. The bolts may be released from locking engagement by aligning a cavity formed in a part that is fixed in relation to the probe.

Optionally the coupling assembly may comprise two male members each having a shut off valve slidably mounted thereon. Each shut off valve may include means to lock to the other shut off valve when the shut off valve is in an open position. Here the coupling assembly includes a cage that, when coupled, restricts the movement of the two members, except in the direction of the coupling axis. Thus the cage carries the separation forces generated in a direction other than the coupling direction.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF THE INVENTION

Figure 1:
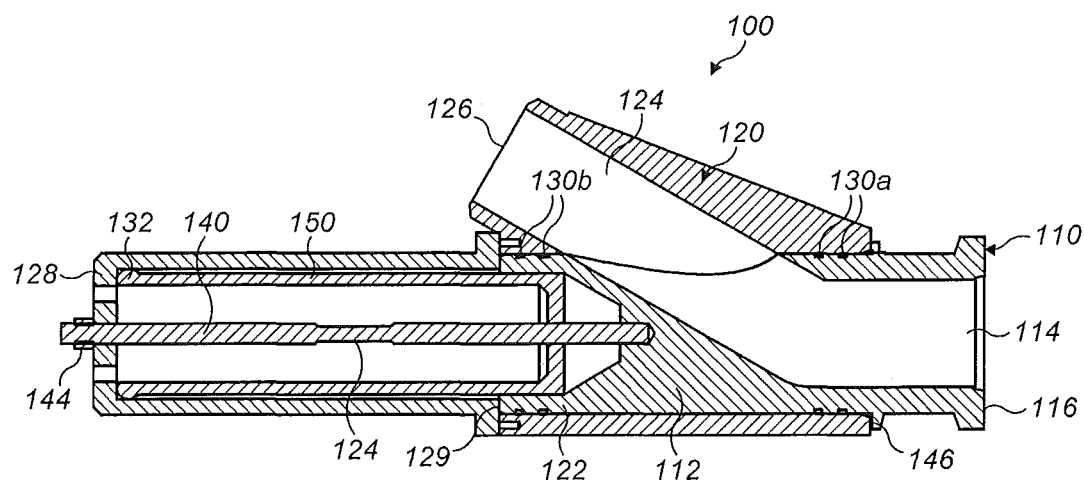
FIG. 1 is a cross-sectional view through a coupling assembly according to a first embodiment in a mated position.

FIG. 1 shows a first embodiment of a coupling assembly 100. Here the coupling assembly 100 is shown in a mated position. The coupling assembly comprises a male member 110 having a probe 112 and a through bore 114 that extends from a distal end 116 to a circumferential face of the probe 112. The coupling assembly 100 further comprises a female member 120 having a socket 122. When the coupling assembly 100 is mated the through bores are aligned to provide a fluid conduit. Fluid is retained within the fluid conduit by seals. Here the seals are shown as a pair of double annular sealing rings 130 located between the probe 112 and socket 122, with one pair on either side of the intersection between the two through bores 114 and 124. The seals arranged to be furthest from the probe's end are labelled 130*a* and the other seals 130*b* on the Figures. Suitably the seals 130 are arranged to be balanced and are shown here as both being provided within annular grooves on the probe 112. It will be appreciated through that the seals 130 could equally be carried by the socket 122 or the coupling assembly 100 could be arranged to have a net closing force by locating the seal 130 closest to an entrance to the socket on the socket 122 and the other seal on the probe 112.

FIG. 1 further comprises a tension component 140. The tension component is a single component that extends in a plane parallel to the coupling axis of the probe and socket. The tension component 140 ties the probe to the socket when mated. In use the tension component consequently carries all the axial tension applied to the coupling assembly. Therefore, in order to decouple the coupling assembly 100 by withdrawing the probe 112 from the socket 122 it is necessary to either remove the tension component 140 or apply an axial force withdrawing the probe from the socket that is sufficient to fracture the tension component.

Advantageously, because the tension component 140 is a single piece, the break out force can be set easily and exactly by controlling a fracture zone 142 formed in the tension component 140. Moreover, because the probe and socket are released upon the failure of one component, there is a reduced likelihood of the probe becoming jammed in the socket.

Preferably the tension component 140 is pre-stressed. For instance, the tension component 140 is shown in FIG. 1 as a rod or bar that is fixed to a tip 118 of the probe. When the coupling assembly is mated, the tension component 140 extends through an aperture formed in the base 128 of the socket. A stop such as a nut 144 is fixed to a threaded end of the tension component. Thus the nut 124 stops the tension component from moving relative to the socket thereby requiring the tension component to fracture in order to decouple the assembly. Obviously, should the need arise, the nut can be removed manually in order to decouple the assembly without destroying the tension component. The tension component 140 is pre-stressed by tightening the nut. Thus a tension is applied to the tension component such that the male and female parts are locked together. No movement therefore occurs in contrast to the situation when shear pins are used. Furthermore, by applying different pre-stressed forces in the tension component, for instance by tightening the nut different amounts the break out force can be easily adapted. Consequently if the coupling 100 is placed in deep water, the amount of pre-stress applied to the tension component can be set accordingly.

FIG. 1 further shows the male member including a probe extension 150. The probe extension 150 comprises an extension to the probe having reduced cross-sectional area to the probe 112. A supplementary seal 132 is sealed to the end of the probe extension. The supplementary seal 132 forms a seal between the probe extension 150 and the socket 122. When the coupling assembly is mated, the probe terminates at a hip 129 formed in the socket 122. The hip 129 divides the socket 122 into a first part nearest the entrance to the socket and a second portion, having a reduced cross sectional area to the first. The probe extension 150 is shown in FIG. 1 as comprising a tubular member attached to the tip of the probe 122. The probe extension 150 may be a separate part or may be integrally formed. Because the probe extension is hollow, the tension component 140 is provided with additional space, which particularly allows the coupling assembly 100 to accommodate a longer tension component 140. The probe extension 150 is sized so as to extend the length of the male member by the length of the first part of the socket. Consequently, as the male member 110 is withdrawn from the female member 120, an axis of the probe 112 is maintained in a coincident relationship with an axis of the socket until the last of the seals 130b located towards the end of the probe have been withdrawn from the socket. For instance, without the probe extension, once the probe has been withdrawn such that the last of the seals 130a are no longer sealed against the socket, the probe would be free to move within the socket such that the axis of the probe is no longer aligned with the axis of the socket. In contrast, because the probe extension is sized such that the supplementary seal 132 remains sealed to the socket until the last of the seals 130b leaves the socket, the probe can not become misaligned until the probe is almost completely withdrawn. Because the cross sectional area of the probe extension is less than that of the probe, jamming of the probe extension within the first part of the socket is not a particular issue.

Figure 2:
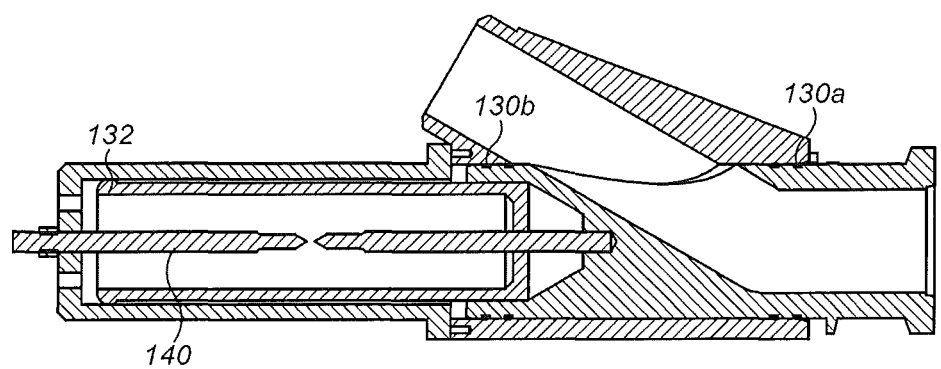
FIGS. 2 to 4 show cross-sectional views of the coupling assembly at various positions during decoupling.

In use, the male and female coupling members are coupled by inserting the male member into the female member and tightening the nut 144 to the end of the tension component 140. Fluid can then be passed between passageways (not shown) connected to the ends of the male and female members. The coupling assembly can be broken apart by applying a force to the ends of the male and female members to urge them apart. If the force exceeds the predetermined fracture tension of the tension component, the tension component fractures as shown in FIG. 2. Consequently the male and female coupling members start to move apart. FIG. 2 shows the withdrawal of the probe at a point just before the first seals 130a begin to withdraw from the socket. Up until this point, the male member has been supported within the socket by the three seals 130a 130b and 132. As such the male member is maintained in a coincident plane to the socket. As the male member continues to withdraw, jamming of the probe within the socket is continued to be prevented by the dual points of contact provided by the second seals 130b and supplementary seal 132.

Figure 3:
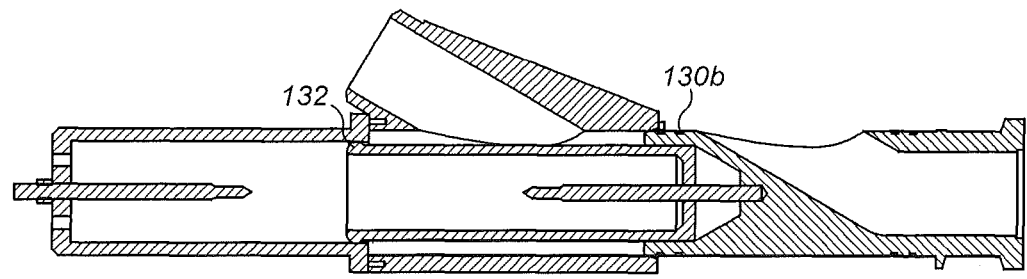
Figure 4:
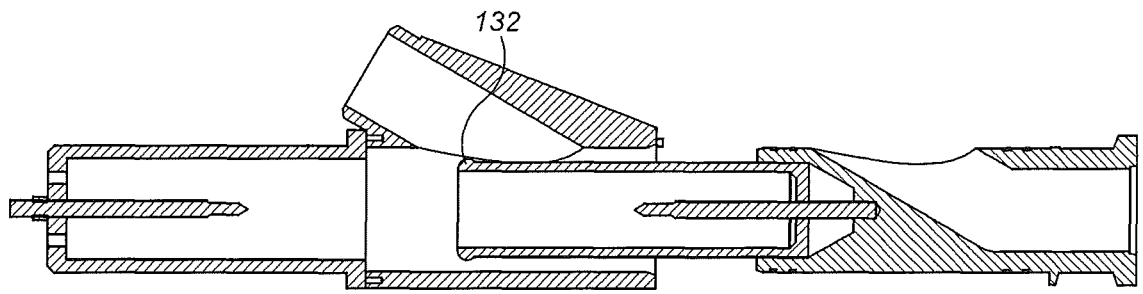

FIG. 3 shows the probe at a point where the second seals 130b begin to withdraw from the socket. At this point, the probe is able to move to be inclined relative to the socket and jamming becomes an issue because only one seal is in contact with the socket. However, because the probe extension 150 is sized so that the supplementary seal remains sealed to the socket substantially until the seals 130b begin to be withdrawn, the distance that the male member needs to be withdrawn whilst supported within the socket by only one seal is much reduced. Thus the chance of jamming is reduced. It will be appreciated that the length of the probe extension could be slightly longer or shorter than the optimum as this would still reduce the chance of jamming by reducing the length that the male member has to be withdrawn whilst supported by only one seal.

Once the male member has been withdrawn such that the probe extension has cleared the hip 129 in the socket 122, jamming is no longer an issue because of the difference in the diameter of the first part of the socket and diameter of the probe extension 150. It will therefore be appreciated that the difference in the diameters of the probe extension 150 and first part of the socket 122 needs to be sufficient such that jamming is not an issue. It has been found that a difference in the cross sectional area of at least 1-2% but preferably at least 3-5% is sufficient to ensure that the probe extension 150 does not jam within the first part of the socket 122.

Figure 5:
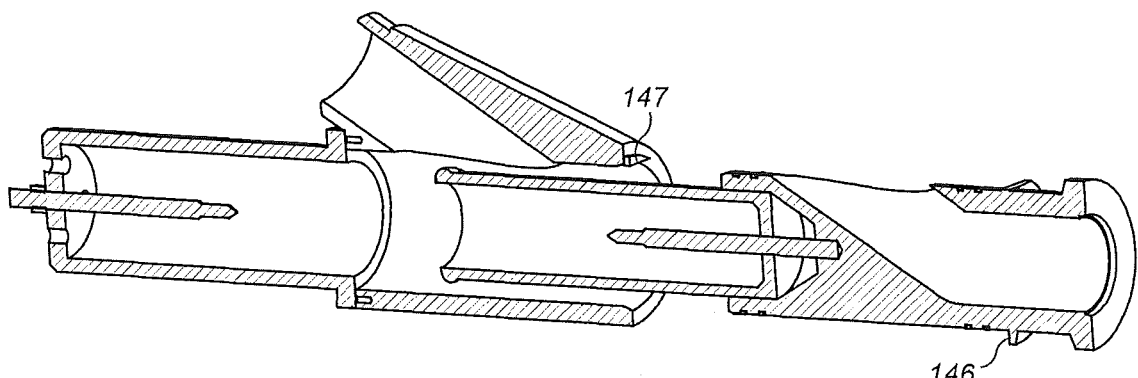
FIG. 5 is a perspective sectional view of FIG. 4.

FIG. 5 shows an additional feature of the coupling assembly 100. Here an annular flange 146 is visible. The annular flange extends outwardly from the male member between the seal 130a and end of the male member. The annular flange 146 does not extend the full circumference of the male member. Rather an area of the periphery of the male member is left with no flange or the flange is arranged with reduced height. The annular flange 146 may act as a stop for when the male and female members are coupled as shown in FIG. 1. Referring back to FIG. 5, the female member includes a protrusion 147 formed on the entrance to the socket 122. The protrusion is located to correspond to the location of the area of the probe not including the annular flange 146 when the coupling assembly is mated. Consequently, the coupling assembly can not be fully mated until the male member has been correctly rotated within the socket 122. In use, engagement of the protrusion 147 and annular flange 146 provide the coupling assembly 100 with torsional stiffness.

The coupling assembly 100 is particularly suited to situations where the breakout force applied to the coupling assembly is applied deliberately. For instance, in situations such as where an iceberg's movement is anticipated to affect the pipeline, the pipeline can be drained and the coupling assembly broken to avoid damage to the pipeline and other delicate components. In contrast, when the pipeline is affected by an unforeseeable event such as an underwater mudslide, it is preferable for the coupling assembly to be broken whilst fluid remains within the pipeline and with limited contamination of the fluid to the surrounding environment.

Figure 6:
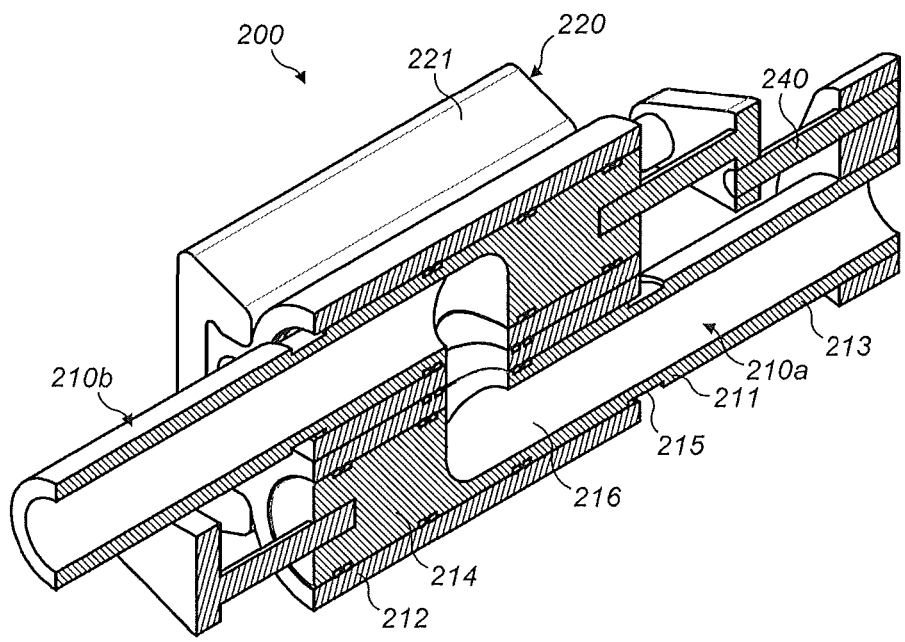
FIG. 6 shows a cross-sectional view through a coupling assembly according to a second embodiment in a mated position.

Consequently, FIG. 6 shows a second embodiment of a coupling assembly 200. Here a first male member 210a and second male member 210b are coupled together. Each coupling member includes a piston 211 and shut off valve 212. A female assembly 220 is formed from the shut off valve 212 of each male member and a cage 221 that holds the two shut off valves releasably together. A tension component 240 couples the piston 221 of the first coupling member to the piston 221 of the second. In use the tension component 240 therefore carries all the axial load applied to the coupling assembly 200. Consequently, once coupled and the tension component 240 set, the coupling assembly 200 cannot be decoupled until the tension component 240 has been broken. Furthermore, as will be explained herein, the two male members 210 cannot be separated until after both the shut off valves 212 have been closed. Accordingly, fluid escape to the environment is limited even when the coupling assembly 200 is broken with fluid within the pipeline.

The tension component 240 comprises a rod or bar that extends through a hole in on of the parts as before. Accordingly, the tension component 240 can be fixed in place as before with a stop located to the protruding side. For instance, a nut (not shown) can be tightened to a threaded end of the tension component 240. Thus, this allows the tension component 240 to be pre-stressed as previously described.

Figure 7:
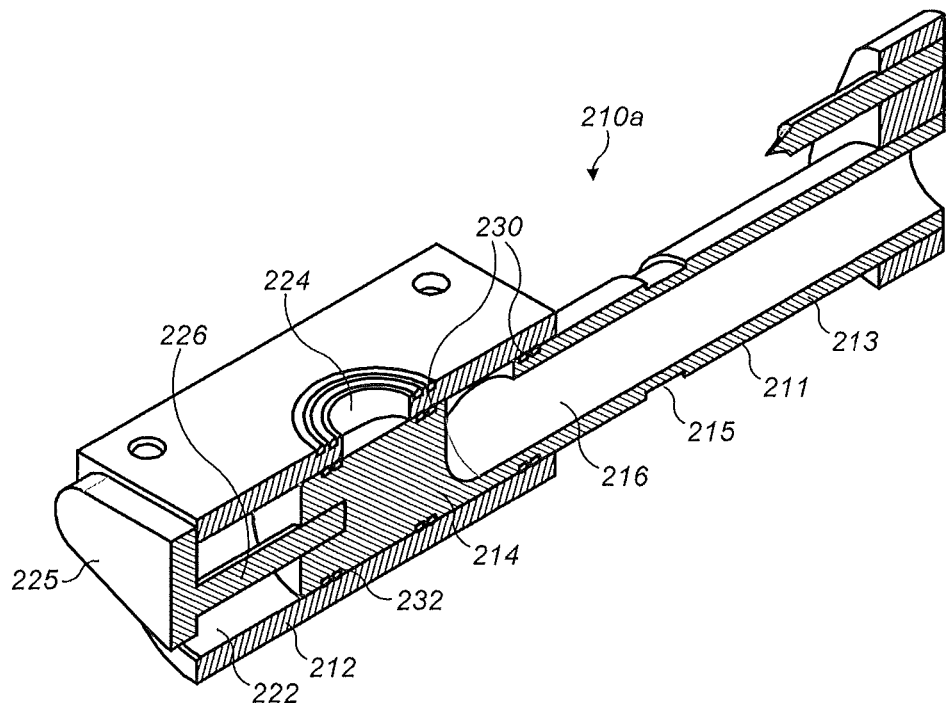
FIG. 7 shows a cross-sectional view of a male member of the second coupling assembly embodiment.

The coupling assembly 200 comprises a first male member 210a and a second male member 210b. Each coupling member 210 has a piston 211 as shown in more detail in FIG. 7. Suitably the piston 211 is shown in the Figures as a generally cylindrical rod. The piston 211 is provided with a distal end 213 and a probe end 214. Here the two ends are separated by a radial flange 215 that extends about the periphery of the piston 211. The piston 211 has a fluid passageway 216 that extends from an end face of the distal end 213 and a circumferential face of the probe 214. The fluid passageway 216 is suitably shown as two blind bores. One of the blind bores extends along the axis of the probe 211 whilst the other extends at an angle to the axis of the probe in order to terminate on a circumferential face of the probe. It will be appreciated from the description that follows that the exact path of the fluid passageway is not particularly important, as long as it terminates on the circumferential face.

Each coupling member 210a, 210b includes a shut off valve 212. The shut off valve comprises a component having a socket 222 for receiving the probe 214 of the male member. The socket 222 is suitably shown as a cylindrical bore. The shut off valve 212 includes an exit aperture 224 that forms a fluid passageway between a circumferential face of the socket 222 and an outer surface of the shut off valve 212. The shut off valve 212 is assembled to the male member 210 in a slidable manner. The male member includes stops for restricting the movement of the shut off valve. Suitably the annular flange 215 may form the stop to one side of the probe 212. A second stop is provided towards a tip of the probe. The second stop is shown here as a plate 225 held to the tip of the probe at a spaced relationship by a rod 226 that extends coincident to the axis of the probe 211. Consequently, the shut off valve 212 can slide along the probe 211 between two extents. When the shut off valve 212 abuts the stop 225 on the tip of the probe, the exit aperture 224 is closed by an end of the probe and the fluid passageway 215 is closed by an internal face of the socket 222. When the shut off valve abuts the other stop the exit aperture is in fluid communication with the fluid passageway 216 in the male member.

Seals are provided between the socket and probe in order to maintain the fluid. For instance, an annual sealing area 230 comprising a paid of ring seals is provided in an annular recess formed in the probe on either side of the fluid passageway's exit. A further annular sealing area 232 is provided towards the tip of the probe for sealing the exit aperture 224 closed.

Figure 8:
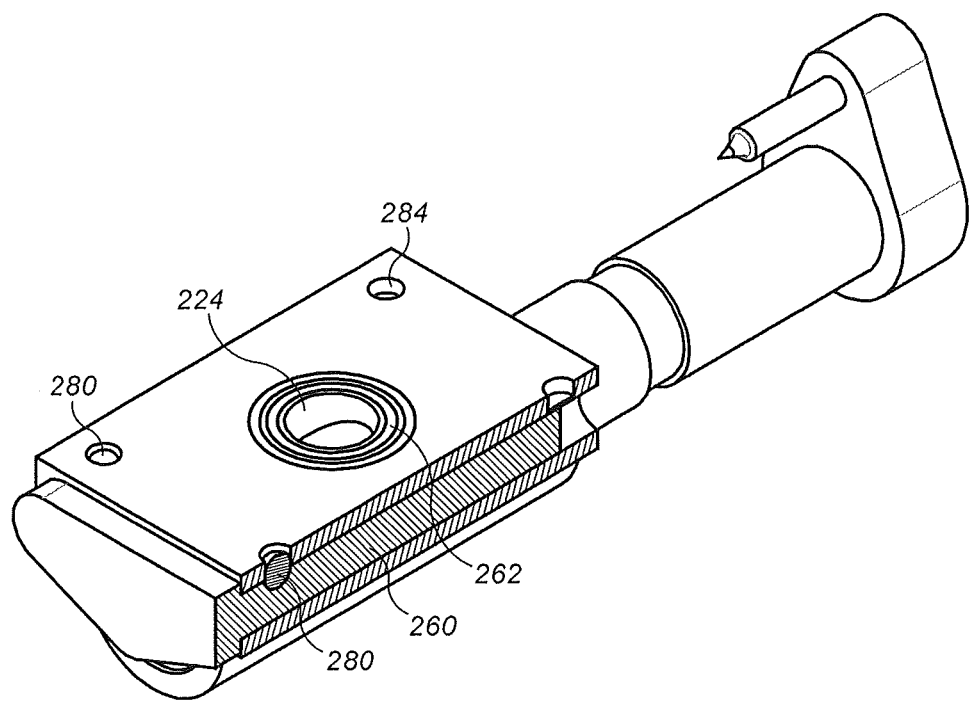
FIG. 8 shows a partial cross-sectional view of FIG. 7.

The male member includes means to stabilise the shut off valve 212 in order to prevent it from rotating about the probe 211. Suitably, at least one off-centre stabilising rod is provided to one side of the piston's axis. The stabilising rod is fixed relative to the piston 211. The stabilising rod co-operates with a corresponding bore in the shut off valve such that the stabilising rod slides within the bore. In FIG. 8, the means to stabilise the shut off valve 212 is shown as two off-centre stabilising rods 260. The stabilising rods 260 are fixed to the plate 225 that forms the stop. The stabilising rods 260 are arranged either side of the piston's axis and extend parallel to each other and the piston's axis. Consequently the off-centre stabilising rods 260 prevent the shut off valve 212 from rotating about the probe 211.

Figure 9:
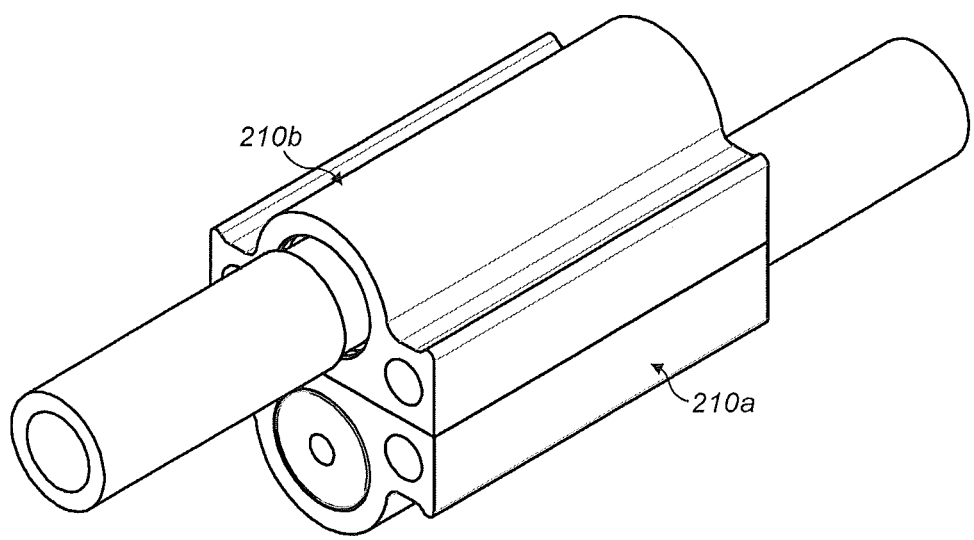
FIGS. 9 and 10 show perspective views of an assembly of two male members.

In order to couple two pipe lines, two male members substantially as described above are taken and placed one on top of the other in inverted relationship, as shown in FIG. 9. When arranged in place, the exit aperture 224 in each part should be in fluid communication. Therefore, if the parts are identical, it will be appreciated that the exit aperture is preferably located in the middle of the male member. As shown in FIG. 8, a sealing area is provided about the periphery of the exit aperture. Suitably, the sealing area is shown as a pair of ring seals 262. When two male members 210 are arranged in inverted relationship, the sealing areas provide a seal between the two exit apertures 224.

Figure 10:
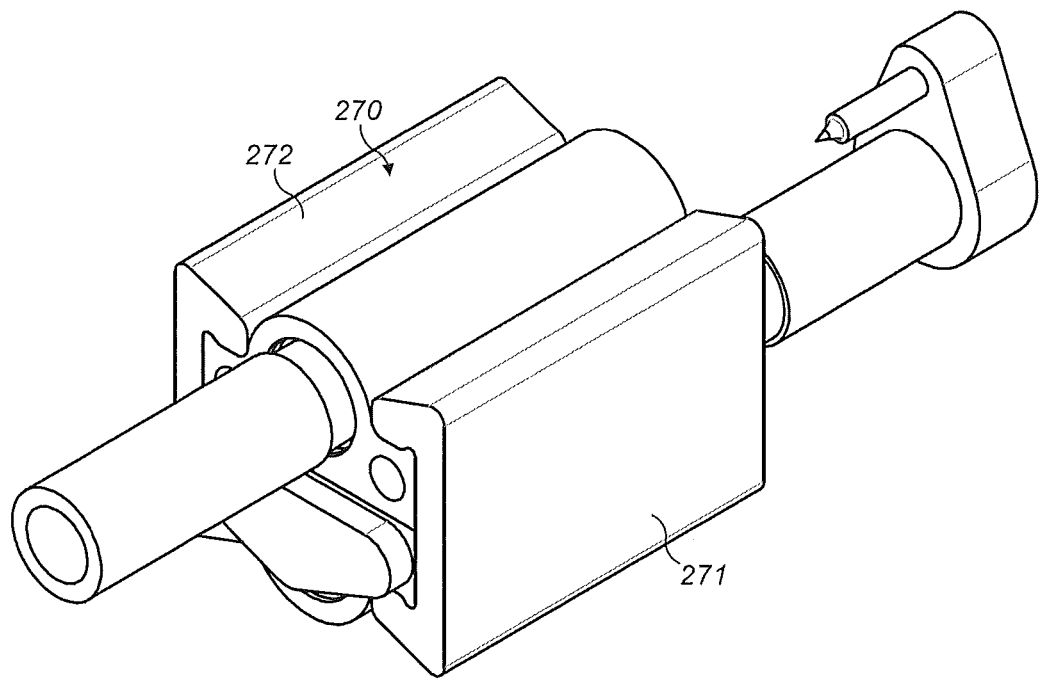

In order to prevent the two parts from moving apart relative to a direction other than parallel to the probe's axis, a retainer is assembled to the two members. The retainer is shown in FIG. 10 as a cage 260. The cage 270 is shown in FIG. 10 as two parts 271, 272 but the two parts may equally be integrally formed. Each part of the cage 271, 272 clamps either side of the two male members 210 together. Each cage part 271, 272 carries the load by being generally L-shaped in cross section. When the cage parts are separate, they are prevented from being knocked off the sides of the coupling assembly by including an overhang. Thus the male members 210 include a neck that is thinner than an area towards the edge. Consequently, the two cage parts can be slid into position. In order to reduce the chance of the cage parts becoming jammed as they slide it may be preferable to include a taper on the parts such that they have a wedge affect.

Figure 11:
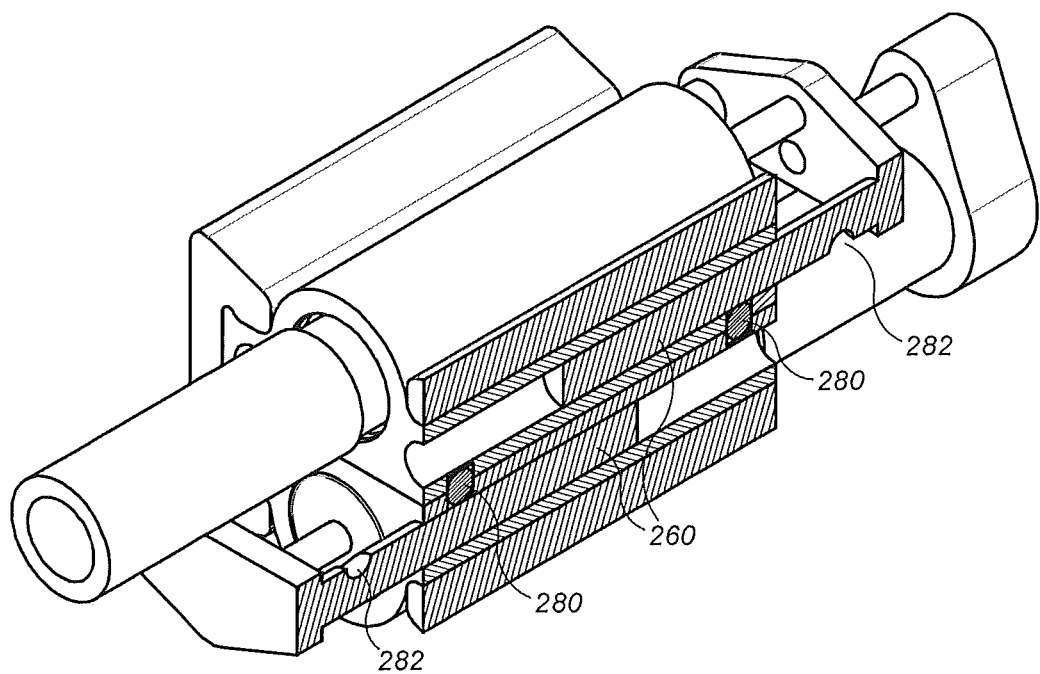
FIG. 11 shows a partial cross-sectional perspective view of the second coupling assembly embodiment.

Each male member comprises a releasable locking means that releasably locks the shut off valve of the first male member and the shut off valve of the second male member to prevent relative movement in the axis of the probe when the exit apertures are open. In FIG. 11, the releasable clamping means are shown suitably comprising bolts 280 that extend from an aperture in one shut off valve to an aperture in the other shut off valve. When the shut off valve is in a position relative to the probe such that the exit aperture is closed, the bolts are released such that they can withdraw from the aperture of one of the shut off valves. Suitably, the apertures can be in communication with one of the bores for receiving the stabilising rods 260. Therefore, by forming a cavity 282 for receiving the bolt 280 only in a location corresponding to a closed position of the exit aperture 224, the bolts 280 are maintained in a locked position until the cavity 282 is aligned to them. At this point they are free to move into the cavity and therefore move clear of the other aperture. It will be appreciated from FIG. 8 that the stabilising rods 260 of one male member include a cavity to receive the bolts 280 towards the distal end whereas the apparatus 284 are for engaging bolts from the other male member.

Figure 12:
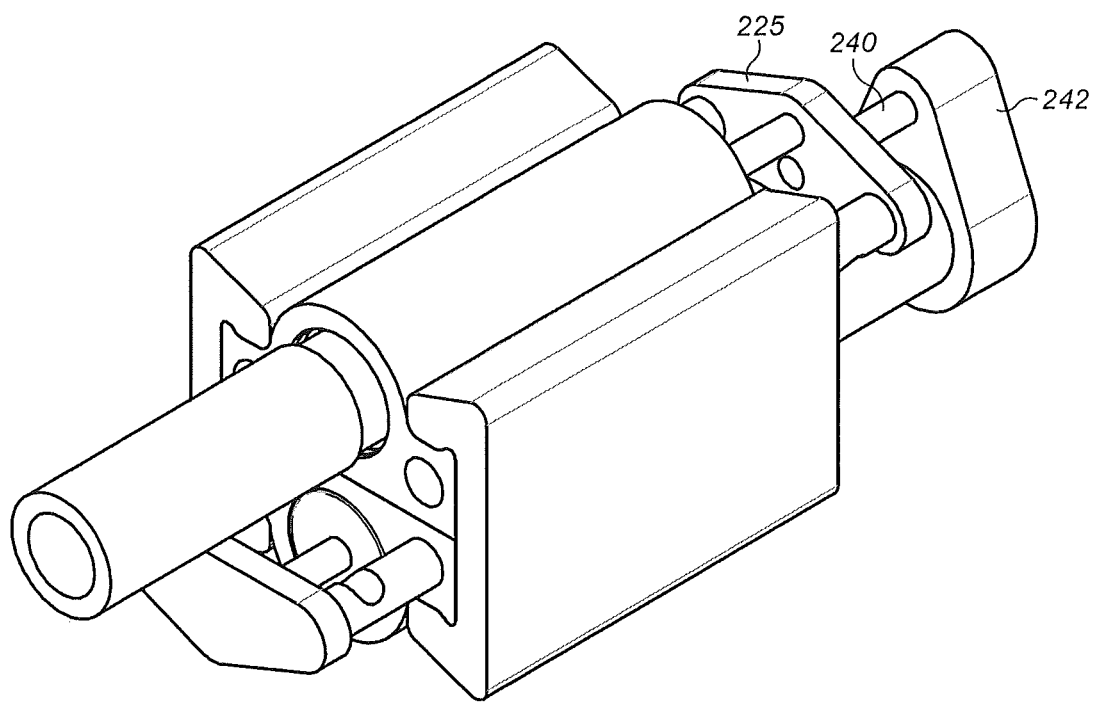
FIG. 12 shows a perspective view of FIG. 11.

As shown in FIG. 12, the tension component 240 is coupled to one probe via a collar 242. The collar 242 is held fast to the probe. The tension component 240 is coupled to the other probe via the stop plate 225. Once assembled, the tension component 240, which is carried by and secured to one of the parts extends through a hole in the other. Thus the tension component can be pre-stressed as previously described.

Figure 13:
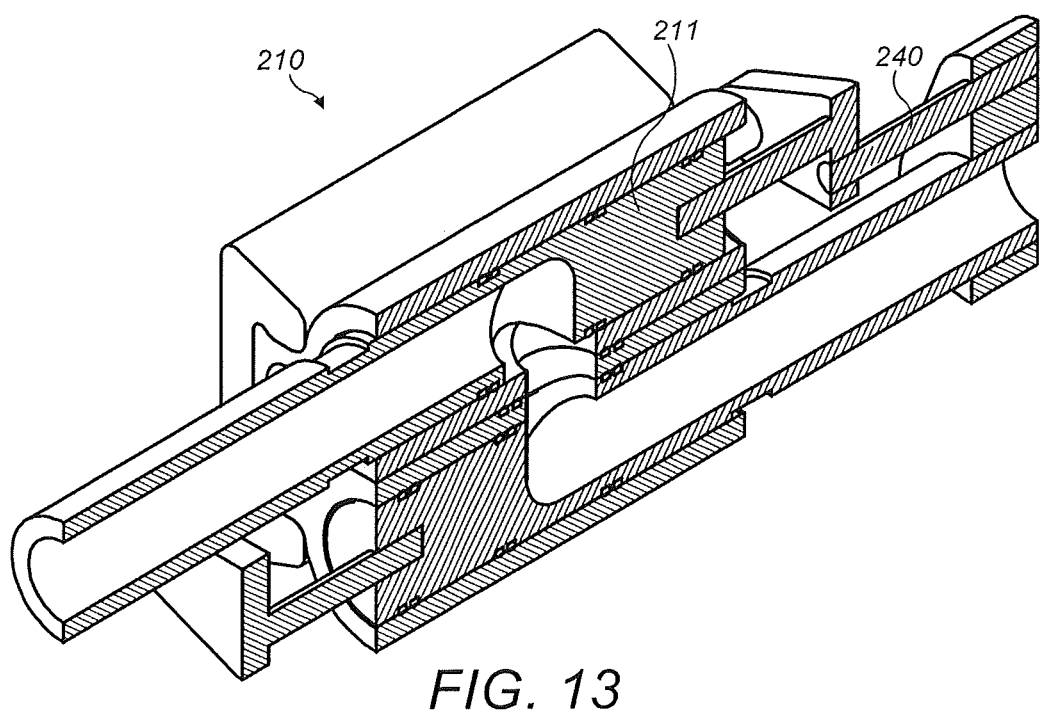
FIGS. 13-17 show a series of views depicting the decoupling of the second coupling assembly embodiment.
Figure 14:
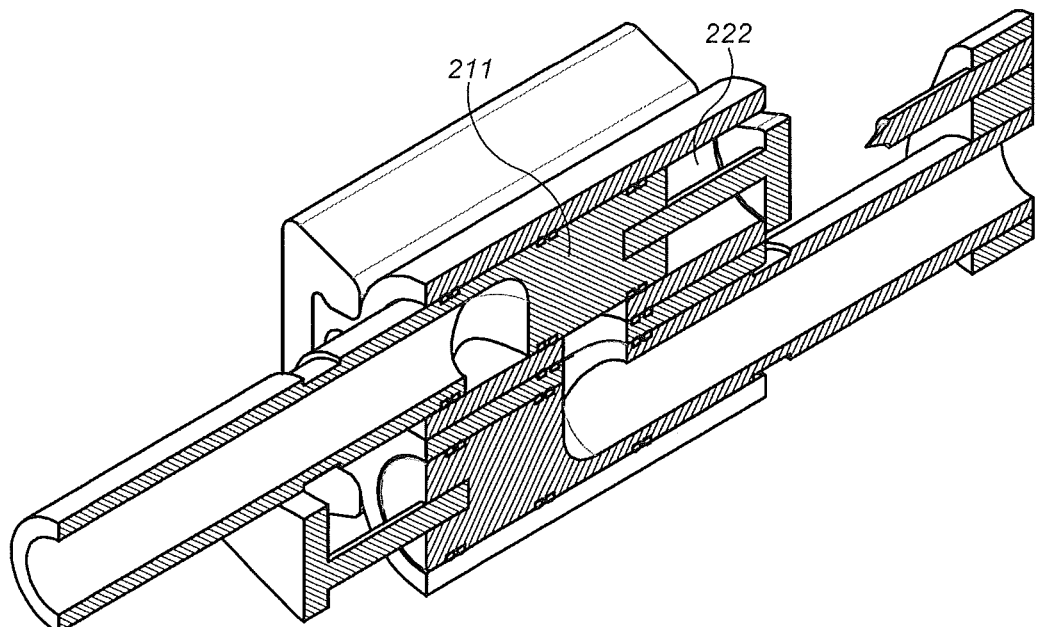
Figure 15:
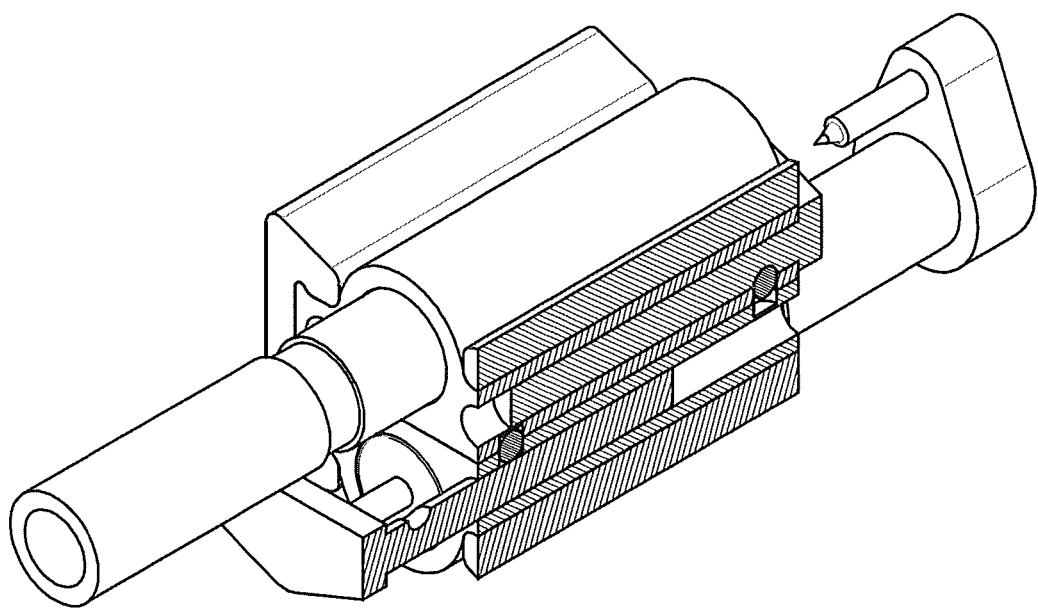

FIG. 13 shows the coupling assembly 200 in a coupled position, wherein the tension component 240 has just fractured due to a tensile force being applied to pull the male members apart. Because the shut off valves are in an open position, the bolts 280 lock the two shut off valves 212 together. Thus as further tension is applied to the two male members, the probes 211 are urged to withdraw from the sockets 222. FIG. 14 shows the coupling assembly 200 where one of the male members has been closed. Here the probe 211 has been withdrawn from the socket 222 such that the shut off valve 212 has moved relative to the probe 211 to close the fluid passageway 216 and exit aperture 224. However, as shown in FIG. 15, although the bolts 280 associated with the closed shut off valve 212 are free to move out of the aperture in the other shut off valve due to the alignment of the cavity 282, because the other shut off valve 212 is still in the open position, the two shut off valves remain locked together.

Figure 16:
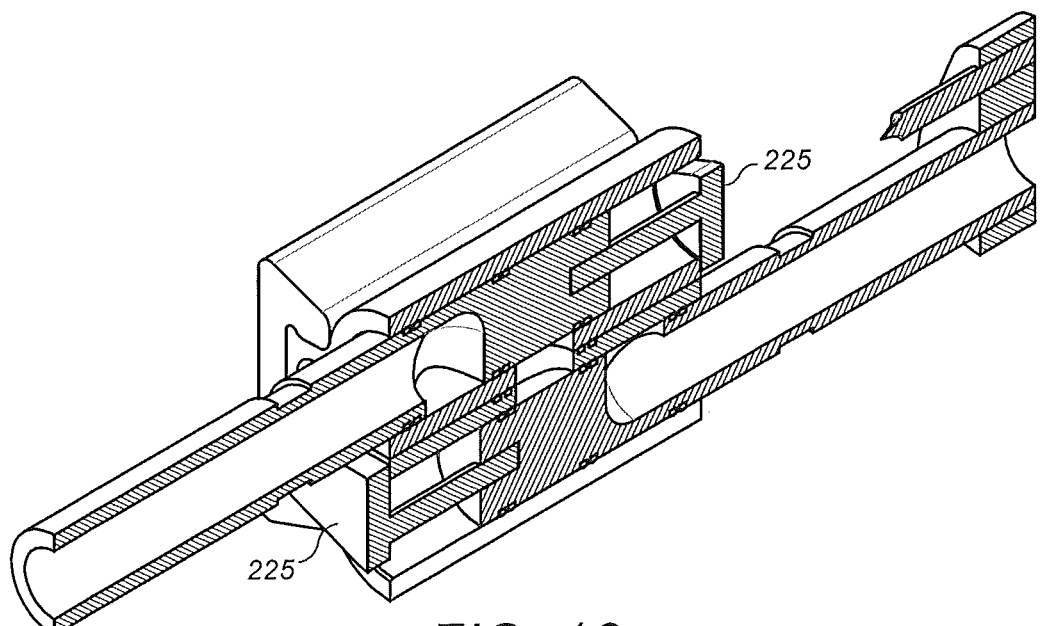
Figure 17:
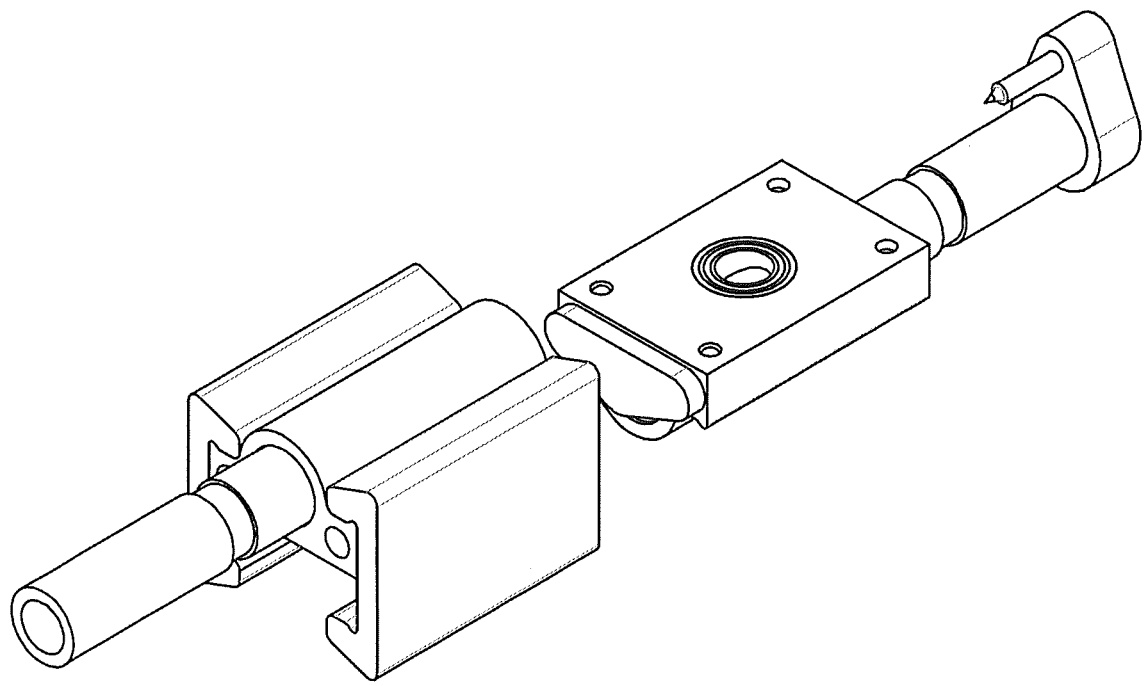

Further tension therefore causes the other probe 211 to be withdrawn from its respective socket 222. As shown in FIG. 16, once both shut off valves 212 are in the closed position, all the bolts are able to move away from the aperture in the other shut off valve. Movement of the bolts is aided by the bolts being rounded such that a shear force created as the two shut off valves try to slide relative to each other forces the bolts 280 out of the other aperture. Because the stops 225 abut the ends of the shut off valves 212 to prevent further movement relative to the probe 211, further tension causes the two shut off valves to slide relative to each other. Depending on the friction between the cage 220 and male members the cage will remain attached to one part or the other. Alternatively, the cage will move relative to both parts and be left partially attached to one part or will drop off both parts.

Consequently, there is provided a coupling assembly 200 that can break out at a given force determined by the characteristics of one tension component only. Moreover, the decoupling can be achieved with limited fluid escape to the environment even when the coupling is broken under pressure.

Figure 18A:
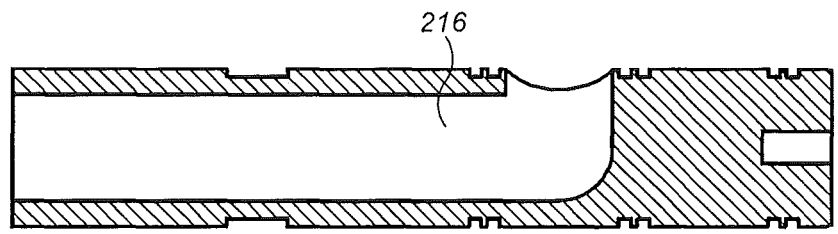
FIG. 18 shows alternative cross-sections through a probe of a male member for use with the second coupling assembly embodiment.
Figure 18B:
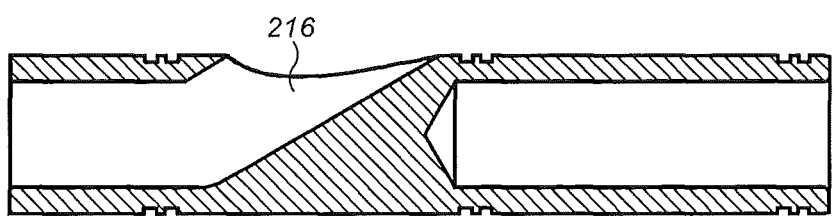
Figure 18C:
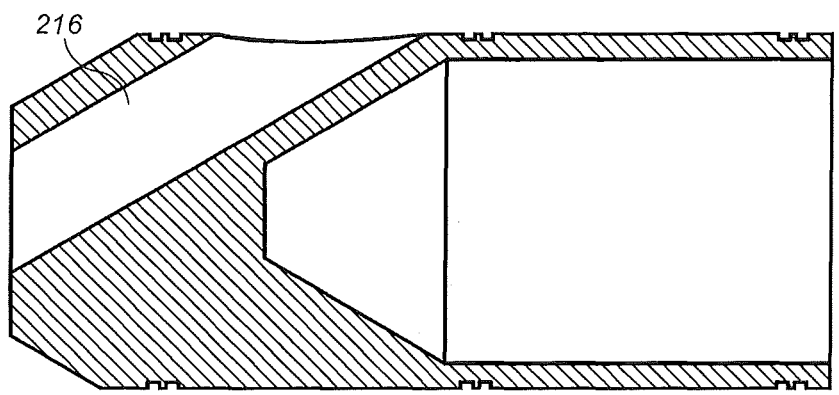
Figure 19:
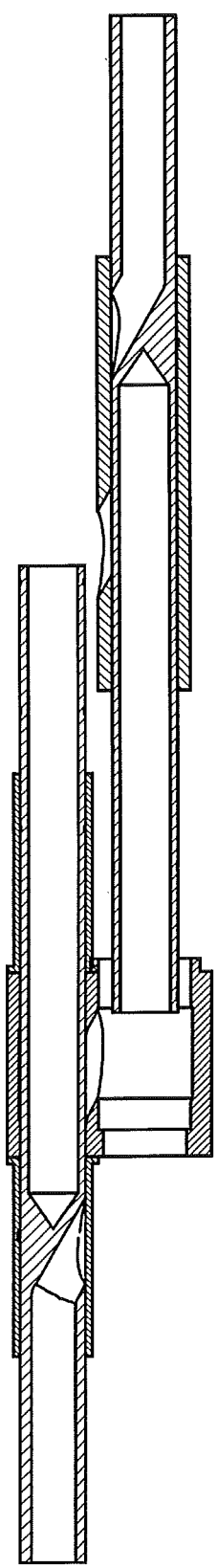
FIG. 19 shows a coupling assembly according to a third embodiment.

FIG. 18*a* shows the cross-section of the piston described above. FIGS. 18*b* and 18*c* show alternative fluid passageway configurations that may be of use. FIG. 18*b* comprises a fluid passageway 216 having a 30° elbow to reduce the disturbance to the fluid flow. FIG. 18*c* shows a fluid passageway 216 having a substantially straight profile.

A drawback to using fluid passageways 216 being angled across the normal to the probe's axis is that the stresses carried by the cage to stop the two shut off valves being forced apart becomes greater. Consequently, it may be necessary to form the cage out of a single part that extends completely around the two shut off valves. As shown in FIG. 1, in this instance, it may be that the shut off valve on one male member is formed integrally to the cage.

The embodiments described herein are able to be decoupled non-destructively by releasing the tension component and decoupling the coupling members so that they can be recoupled at another time, this also allows the coupling to be coupled in situ. However, since a particular use of the couplings is in creating a "fuse" designed to break in an emergency without leaving an open pipe and without, for instance, severing through the pipe line, it is also possible to provide the coupling members in a mated position and with the tension component already securing the coupling together. The pipe line can then be connected by the coupling in situ by attaching pipes to the respective ends of the coupling. This allows the tension component to be precisely set under manufacturing conditions. Here the coupling is designed to remain in place until broken in the event of an emergency. Once broken, the pipes are automatically shut off to prevent catastrophic oil leakage to the environment. The pipes can then be drained and the broken coupling parts removed and replaced.

A further exemplary embodiment is now described with reference to FIGS. 20 to 26.

Figure 20:
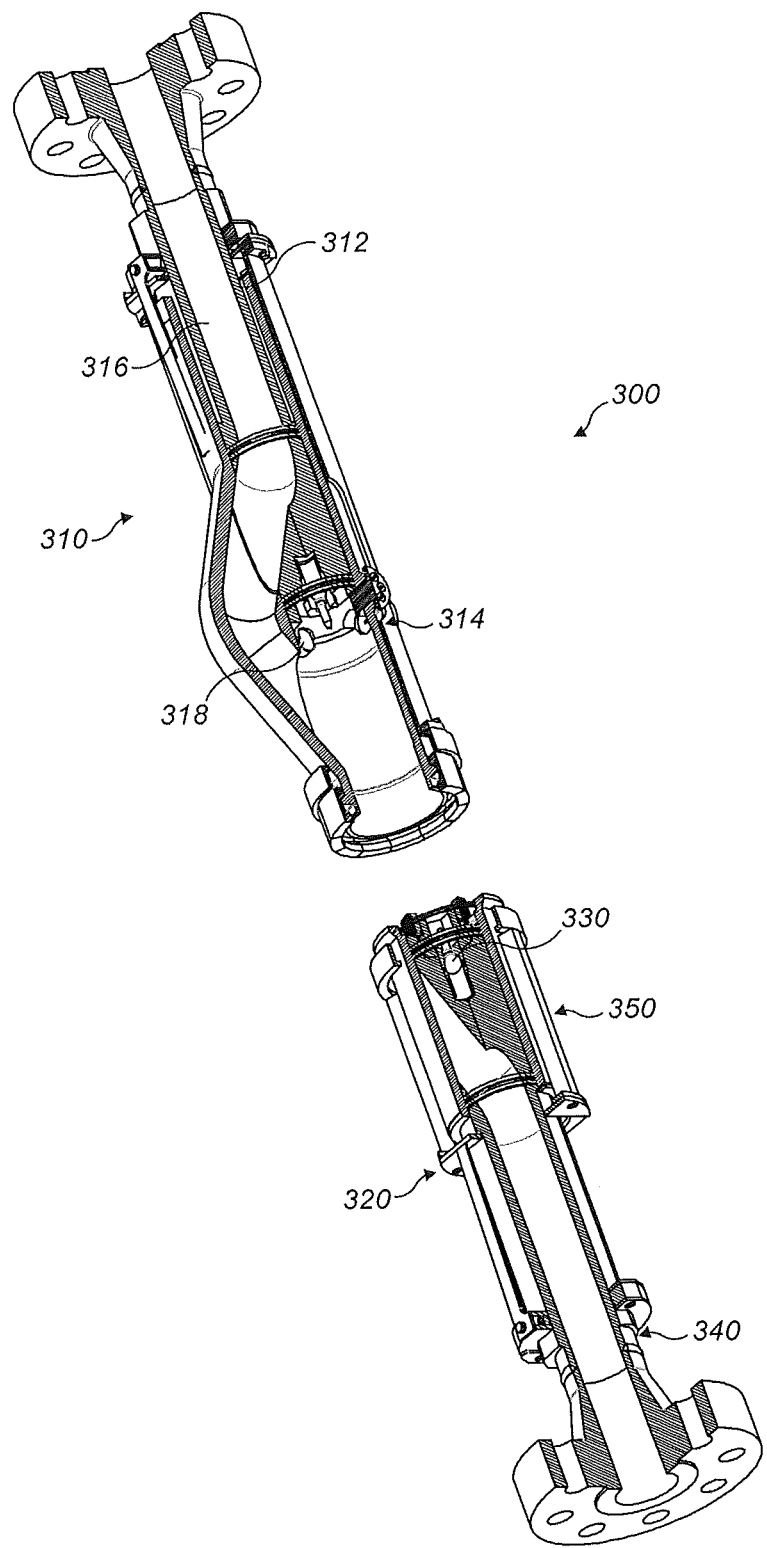
FIG. 20 shows a perspective, cross-sectional view of a coupling assembly according to a third embodiment in a broken position.

FIG. 20 shows a coupling 300 comprising a first and second member. The first member 310 is coupled to the second member 320 by relative movement along a coupling direction. A tensile component is arranged to couple the first and second members when mated in order to resist decoupling. The tension component is a single component and arranged to carry the separation forces between the first and second members. Here the tensile component is arranged, when coupled, along the coupling direction.

Whilst the third embodiment will now be described in relation to a single tensile component, it will be appreciated that even with an alternative breakout means (such as a pinned connection), the third embodiment provides an improved coupling since fluid passageways within the first and second members are automatically shut off as the coupling breaks.

The first member comprises a piston 312 and a sheath 314. The piston 312 is connectable at a distal end to a fluid passageway. A fluid passageway 316 is provided within the piston 312. Here the fluid passageway is substantially straight, being a substantially circular bore that extends from the distal end. The fluid passageway includes an elbow such that the passageway exits on a circumferential face of the piston. The elbow is not critical, but allows a compact design. What is important though, is that the fluid passageway exits on a circumferential face of the piston 312. Seals are provided at either side of the passageway's exit on the circumferential face in order to seal to the sheath 314. In FIG. 20, the first member is shown in the closed position. Here the passageway's exit on the circumferential face is completely sealed by the sheath 314. Means to prevent further withdrawal of the piston 312 from the sheath 314 is provided. Here is it shown as an elongate member that cooperates with a protrusion from the sheath. It will be appreciated that in the closed position, fluid is prevented from escaping the passageway. Moreover because both of the seals either side of the passageway's exit on the circumferential face are attached to one of the sheath or the piston, the piston is balanced and therefore no net closing or opening force is provided between the piston and the sheath. However, dependant on the requirements of the given situation, the seals may be arranged differently in order to provide a net closing or opening force.

The sheath 314 of the first member includes a first end that includes a bore within which the piston is movably mounted. Suitably it is this bore that closes the piston. An opposed end of the first member includes a socket for receiving the second member. Suitably, the second member is inserted into the socket along the same longitudinal axis that the piston is movable relative to the sheath. The sheath 314 includes a middle section. This section provides a fluid passageway between two spaced apertures on internal, circumferential faces of the respective bore and socket within which the piston and second member are movable. Thus, when the piston is moved relative to the sheath to the open position, the aperture on the circumferential faces are aligned to provide a continuous fluid passageway with the seals sealing fluid therein. Further movement of the piston is prevented by a stop. The stop is shown as protrusions 318 in the sheath that abut a distal end of the piston. Preferably, the piston includes locating means. The locating means are cut outs that receive the stop and provide torsional stiffness and aid the correct alignment of the piston and sheath.

The distal end of the piston includes a means to connect to the tensile component. Suitably, the means is a threaded connection such as a threaded blind bore.

The second member includes a probe 340 and a sleeve 350. The sleeve is able to slide along the probe between an open and a closed position. In a closed position the sleeve seals an aperture to a passageway in the second member that exits on a circumferential face of the probe. Here seals are provided either side of the aperture on the circumferential face and arranged on one of the probe 340 or sleeve 350. Thus, when the sleeve 350 is in the closed position the forces are balanced, that is, neither an opening nor closing force is generated. However, dependant on the given requirements, one of the seals can be placed on the other of the probe or sheath in order to provide a net closing or opening force. The sleeve is slidable along the probe relative to the longitudinal direction. In an open position the sleeve 350 does not prevent egress of fluid from the exit of the passageway on the circumferential face of the probe. Means to prevent the sleeve from moving further, past the closed or open position is provided. This is shown as protrusions and an elongate member. The passageway in the second member can form any path. It is shown as being particularly preferable to comprise a straight bore, that is aligned to the probe's axis and an elbow to cause the passageway to exit on the circumferential face.

The probe is sized so as to fit within the socket by relative movement of the first and second members in the coupling direction. Preferably, the seals that close the aperture on the circumferential face of the probe are carried on the probe so that as well as sealing against the sleeve, they also seal against the socket. Thus when the probe is fully inserted into the socket, the socket and probe are sealed such that a sealed passageway is formed between the passageway of the probe and the passageway in the middle section of the sheath of the first member. Again, stops 318 prevent further insertion. Also, suitably a distal end of the probe includes corresponding slots or notches to receive the stops 318 to provide torsional stiffness.

When the probe is inserted into the socket, the sleeve is sized so as to abut the socket. It will therefore be appreciated that inserting the probe into the socket causes the sleeve to move towards the open position. The coupling assembly includes means to lock the sleeve to the socket. The means to lock the two parts automatically unlocks when a decoupling force is applied but only once the sleeve is returned to the closed position relative to the probe. The means is shown suitably as an expandable ring such as a plurality of ring segments. The ring segments fit over an annular protrusion on the sleeve and an annular protrusion on the socket. Thus, when fitted, the sleeve and socket can not be separated without expanding the ring to have a greater radius or moving each segment away from the central axis. Such movement is prevented by a clip that is held to the probe.

The distal end of the probe also includes a means to couple to the tension component. Again, this is suitably a threaded connection such as a threaded blind bore.

The tensile component is suitably provided a tensile assembly 330 having first and second collars 332, 334 that attach to the distal end of the probe and piston. A tensile component 338 is arranged between the two collars. Suitably the two collars are coupled by a control member. The control member 336 controls the two collars and is used to couple the two collars to the respective ends of the coupling members. For instance, the collars include an external thread for screwing into the blind, threaded bores. To avoid rotation of the collars transferring a rotational force to the tension component, the tension component is held within each collar by a universal joint such as a ball and socket joint. It will be appreciated that the joint must retain the tensile component 338 in a lateral position relative to the collars and coupling direction also. Here the control member may be a rotatable member. Consequently, it is preferable for the control member to include an internal threaded bore that external threads on the outside of the collars co-operate with. Thus rotation of the control member causes the collars to rotate. Once the collars bite with the threads of the blind bores, rotation of the control member causes the collars to unscrew from the control member and screw into the blind bores. Thus the tension assembly can be coupled to the first and second members by rotating the control member. As will be described, the sheath of the first member therefore includes an aperture to allow the control member to be accessed, for example with a tool in order to operate. Furthermore, the tension component 338 can be pre-stressed by tightening the control member different amounts. Thus the pretension can be set precisely and repeatedly based on the number of turns.

Figure 21:
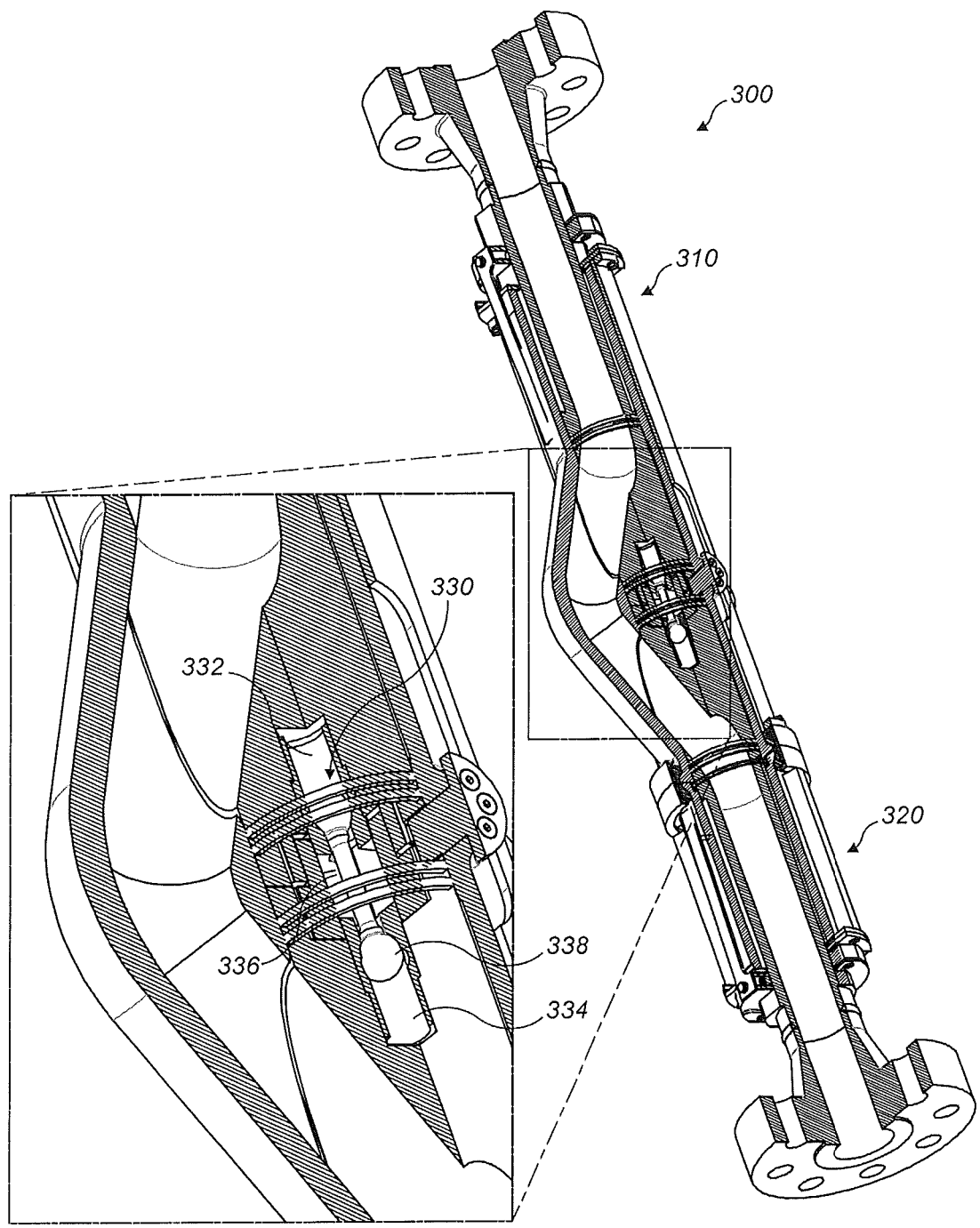
FIG. 21 is a perspective, cross-sectional view of the coupling assembly of FIG. 20 in a initial, joined position.

Referring to FIG. 21 the coupling 300 is shown in an initial joined position. It will be appreciated that this is the factory set position and how it is intended to supply the coupling to the field location. Importantly, the first and second members are supplied coupled. Here the piston in the first member has been moved relative to the sheath in the coupling direction to the open position. Thus a fluid passage is provided between the piston and the middle section. From the alternative end a tensile assembly 330 is inserted and initially left free within the sheath. This is followed by the probe of the second member which is inserted into the socket. Abutment of the sleeve and socket during insertion, causes the sheath of the second member to move to the open position. Thus the fluid passageway in the second member is also moved into communication with the fluid passageway in the sheath of the first member and a fluid passageway created between the two members. The means to lock the sleeve to the socket is applied. The tensile component is then also applied. Here the tensile component connects to both ends of the probe of the second member and piston of the first member. The tensile component is arranged along the longitudinal axis of the relative move between the probe and sheath of the first member. A particularly suitable method of connected the tensile component is to provide an aperture through the sheath of the first member such that the rotating member of the tensile component can be rotated. This causes the threaded members to also rotate and therefore engage the threaded apertures and the distal ends of the respective components. The coupling assembly can now be connected in the field to join to pipes. In use, the coupling provides a fuse that breaks should a decoupling force be applied on the two joined pipes. Importantly, as described herein, the coupling breaks apart without the need to sever the pipes and without significant exposure of the fluid within the pipes to the environment.

Figure 22:
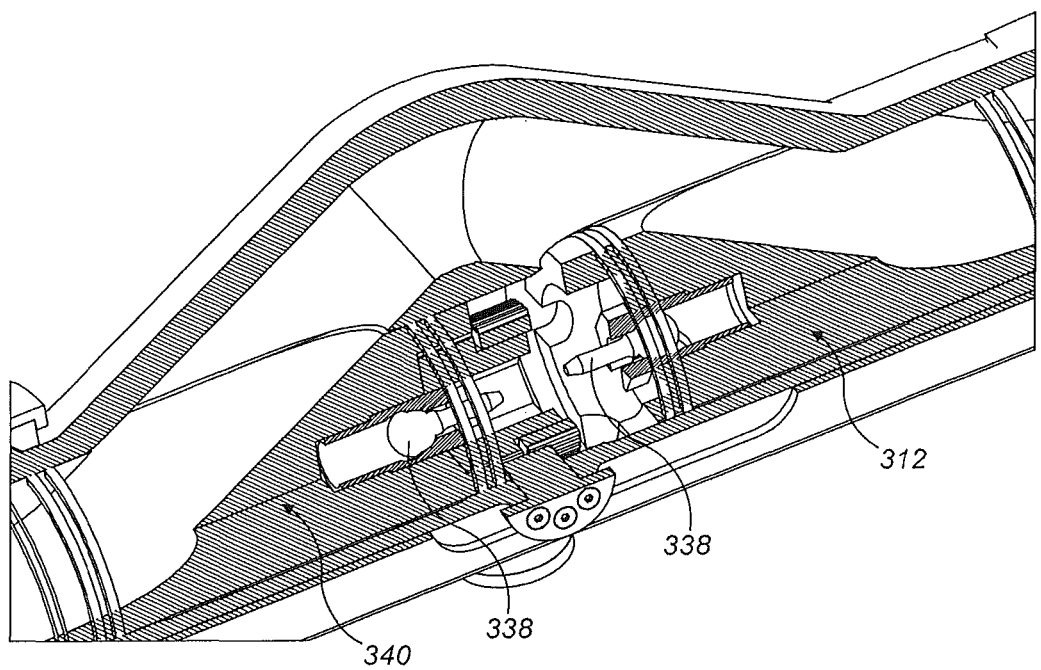
FIGS. 22-26 show perspective, cross-sectional views of the coupling assembly shown in FIGS. 20 and 21 in various stages of breaking apart and decoupling.
Figure 23:
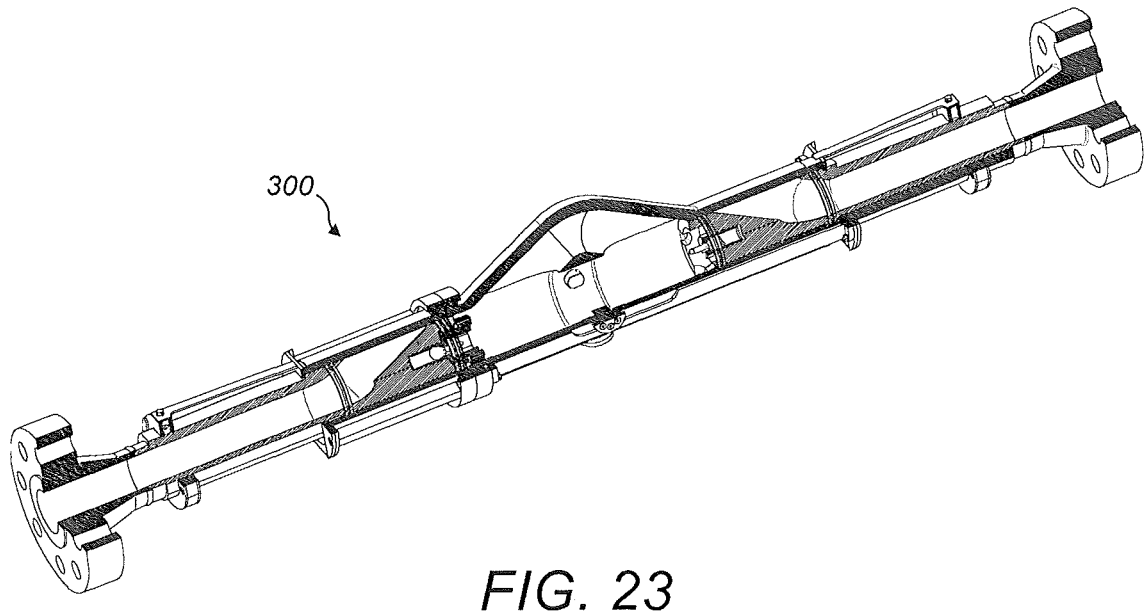
Figure 24:
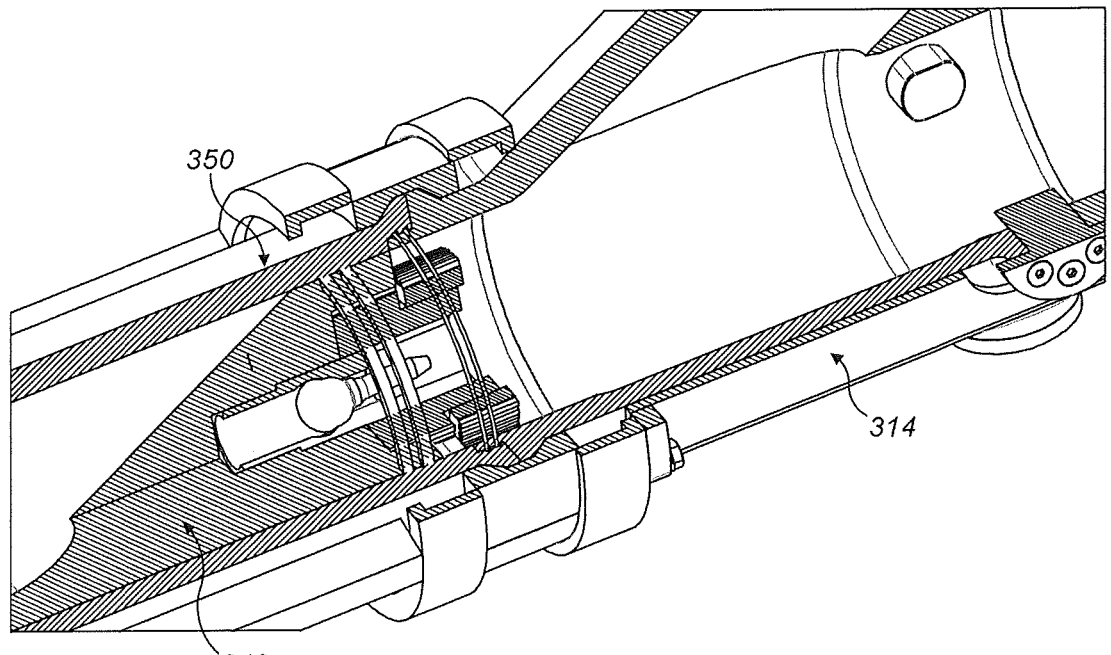
Figure 25:
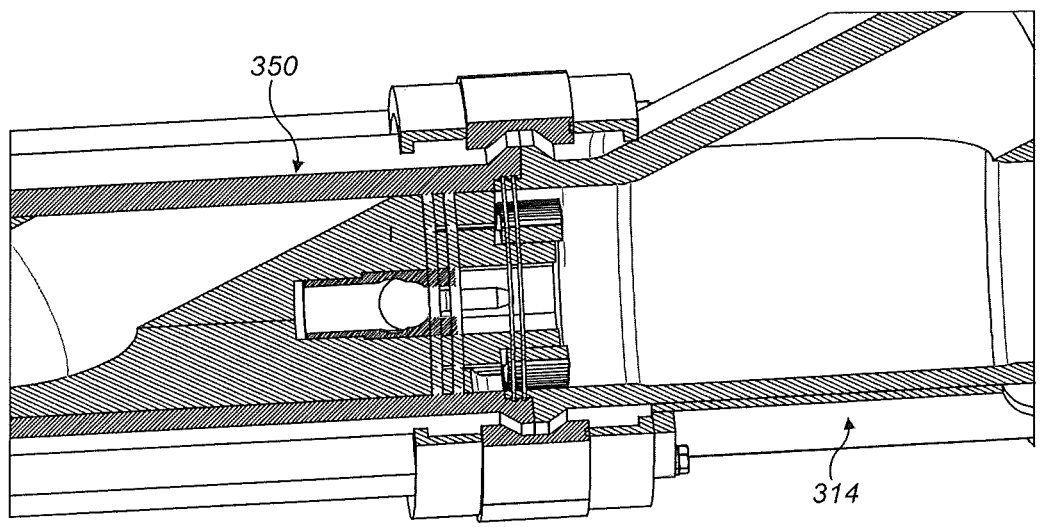
Figure 26:
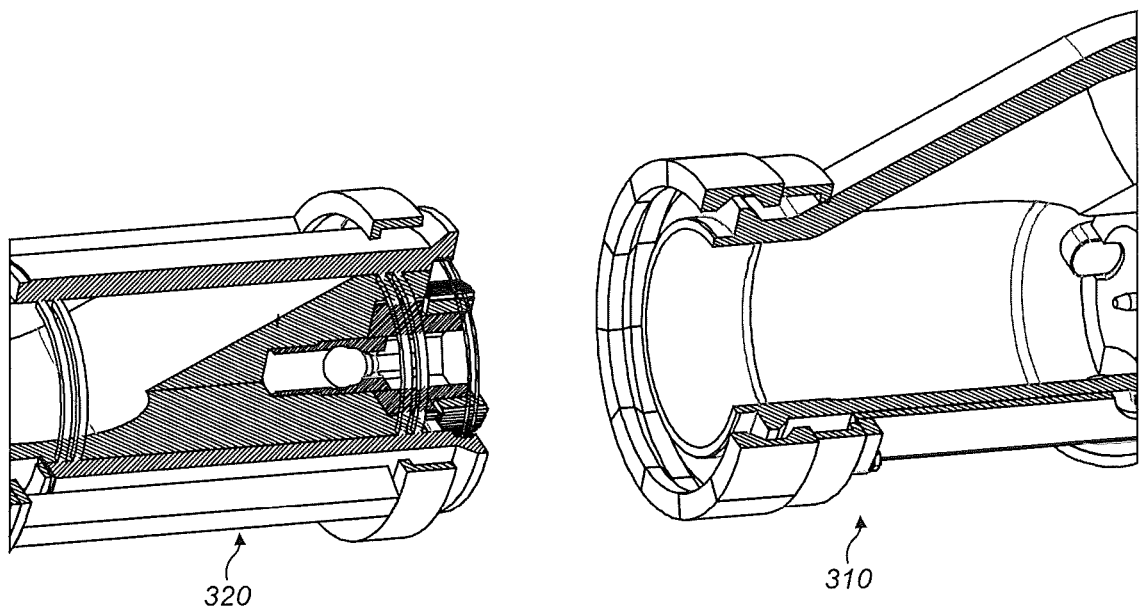

In use and as shown in FIGS. 22 to 26 the tensile component is arranged to break at a predetermined breakout force. As soon as it does so (as shown in FIG. 22), one of the piston or probe decouples or moves relative to the sheath. In FIG. 22 it is shown as the piston moving first, though the exact order is not important. As soon as the seal moves past the aperture on the circumferential face of the bore in the sheath, fluid fills the area housing the tensile component (or the remains thereof). The pressure differential therefore acts on the end of the piston to move the piston to the closed position. Because of abutment between the sheath and piston, further decoupling force on the pipe attached to the first member causes the probe and sheath to move as one. In tandem, as the seal allows fluid into the area housing the tensile component, the pressure differential acts on the probe in order to decouple the probe from the socket. Since the sleeve is locked to the socket, decoupling force applied to the pipes acts to withdraw the probe from the socket. When moved far enough, the sleeve has closed the piston, and the means locking the sleeve and socket therefore automatically releases and the first and second members are therefore decoupled.

Once pulled apart, the two pipes can be drained of fluid under controlled conditions, the first and second members of the broken coupling assembly removed from the ends of the pipes and a new, coupled coupling member attached. Consequently, and advantageously, there is provided a coupling that can be incorporated into pipe lines or other fluid transmission lines, that provides an automatic breakout function should a predetermined force be exceeded pulling the two pipes apart. Thus critical equipment can be protected from damage without the need to sever through pipelines, which opens the ends of the pipes and allows escape of fluid into the atmosphere.

Although preferred embodiment(s) of the present invention have been shown and described, it will be appreciated by those skilled in the art that changes may be made without departing from the scope of the invention as defined in the claims.

The invention claimed is:
1. A coupling assembly comprising:
a first member,
a second member adapted to be coupled to the first member by relative movement along a coupling direction; and
a means to resist, in use, a tensile component in the coupling direction of a de-coupling force;
wherein the means to resist de-coupling is a single tension component arranged to carry the tensile component, and wherein the tension component is arranged outside of a fluid passageway of the coupling assembly;
wherein one member comprises a male member and the other member comprises a female member, the male member having a probe and a fluid passageway that has an exit on circumferential face of the probe, the female member having a socket and a fluid passageway that has an exit on a circumferential face of the socket, the coupling assembly being coupled by inserting the probe into the socket such that the exit to each passageway is in fluid communication, the tension component being arranged to tie the probe to the socket such that the tension component is coincident with an axis of the probe and socket;
wherein the probe includes a shoulder and the socket includes a hip, the probe and socket therefore including a portion having reduced cross-sectional area in relation to the cross sectional area of the probe and socket at a location of the respective exit aperture, wherein:
a first sealing means seals the probe to the socket to one side of the exit aperture on the probe;
a second sealing means seals the probe to the socket to the other side of the exit aperture on the probe; and
a third sealing means seals at part of the reduced cross-sectional area of the probe to a reduced cross-sectional area of the socket such that the probe is supported within the socket by at least two seals whilst any one of the first or second seals are in sealing contact with the socket.
2. The coupling assembly of claim 1 wherein the tension component is elongate and is arranged so that an axis of the elongate tension component is parallel to the coupling direction.
3. The coupling assembly of claim 1 wherein the tension component includes a fracture zone, the fracture zone being an area through which a fracture is engineered to propagate once a pre-determined tensile force has been recorded.
4. The coupling assembly of claim 1 including a means to apply a tensile force to the tension component before using the coupling assembly in order to prestress the tension component.
5. The coupling assembly of claim 4, wherein the tension component is fixed fast to the first member and arranged, once coupled, to extend through an aperture in the second member, wherein the means to apply a tensile force comprises a stop that co-operates with the tension component on an opposite side of the aperture to that of a connection to the first member, the stop co-operating with the tension component and aperture to apply the tension.
6. The coupling assembly of claim 1 wherein the coupling assembly includes a cage and, when the first member is coupled to the second member the cage is arrangeable to prevent relative movement of the shut off valve relative to the opposed member except linear movement in the coupling direction.

7. The coupling assembly of claim 6 wherein the cage comprises part of one of the coupling members.

8. The coupling assembly of claim 6 wherein the cage is separate to both coupling members.

9. A coupling assembly comprising:
- a first member;
- a second member adapted to be coupled to the first member by relative movement along a coupling direction; and
- a means to resist, in use, a tensile component in the coupling direction of a de-coupling force;
- wherein the means to resist de-coupling is a single tension component arranged to carry the tensile component, and wherein the tension component is arranged outside of a fluid passageway of the coupling assembly;
- wherein the first member comprises a male member that includes a probe, a fluid passageway having an exit on a circumferential face of the probe and a shut off valve having an aperture, the shut off valve being movable relative to the probe and between an open position in which the exit aperture on the probe is in fluid communication with the aperture in the shut off valve and a closed position wherein the exit aperture on the shut off valve is closed by the probe;
- wherein the coupling assembly includes a first locking means that is arranged in use to lock the shut off valve of the first member to the opposed second member when the shut off valve is not in the closed position;
- wherein the locking means respectively comprises at least one bolt housed within the shut off valve, each bolt being moveable to a locking position by engagement between the bolt and a part of the male member that is fixed in relation to the probe.

* * * * *